United States Patent
Ishihara

(10) Patent No.: US 9,581,436 B2
(45) Date of Patent: Feb. 28, 2017

(54) IMAGE PROCESSING DEVICE, IMAGE CAPTURING APPARATUS, AND IMAGE PROCESSING METHOD

(71) Applicant: CANON KABUSHIKI KAISHA, Tokyo (JP)

(72) Inventor: Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/502,855

(22) Filed: Sep. 30, 2014

(65) Prior Publication Data
US 2015/0092992 A1 Apr. 2, 2015

(30) Foreign Application Priority Data
Oct. 2, 2013 (JP) .................. 2013-207018

(51) Int. Cl.
*G01B 11/22* (2006.01)
*G06K 9/46* (2006.01)
(Continued)

(52) U.S. Cl.
CPC .............. *G01B 11/22* (2013.01); *G02B 7/365* (2013.01); *G06K 9/4652* (2013.01);
(Continued)

(58) Field of Classification Search
CPC ........ G06T 7/0069; G06T 2207/10028; H04N 5/23212; H04N 5/2226; G02B 7/38; G02B 7/365; G01B 11/22
See application file for complete search history.

(56) References Cited

U.S. PATENT DOCUMENTS 6,363,220 B1    3/2002 Ide
6,963,388 B1 *  11/2005 Ohta .................. H04N 5/23209
                                                      348/345
(Continued)

FOREIGN PATENT DOCUMENTS

CN    103116739 A    5/2013
JP    H1167610 A     3/1999
(Continued)

OTHER PUBLICATIONS

Atif, M., et al., "Optimal depth estimation from a single image by computational imaging using chromatic aberrations" pp. 23-34.
(Continued)

*Primary Examiner* — Jingge Wu
(74) *Attorney, Agent, or Firm* — Canon USA Inc., IP Division

(57) ABSTRACT

An image processing device obtains a depth information image representing a distribution of depth information about an object on the basis of first and second images that have different degrees of blurring and that are captured by an image sensor including groups each including pixels that obtain different color information about the object. The image processing device includes an extracting unit configured to extract signals, each corresponding to one of the pixels of each group, from the groups and generate first and second extracted images respectively corresponding to the first and second images, and a calculating unit configured to calculate the depth information image from a difference in degree of blurring between the first and second extracted images. The signals each corresponding to one of the pixels of each group and extracted from the groups are signals corresponding to pixels that obtain the same color information.

12 Claims, 10 Drawing Sheets

(51) Int. Cl.
  *G06T 7/00* (2006.01)
  *H04N 5/232* (2006.01)
  *G02B 7/36* (2006.01)
  *H04N 5/235* (2006.01)
  *H04N 9/04* (2006.01)

(52) U.S. Cl.
  CPC ......... *G06T 7/0069* (2013.01); *H04N 5/2356* (2013.01); *H04N 5/23212* (2013.01); *H04N 9/045* (2013.01); *G06T 2207/10004* (2013.01); *G06T 2207/10148* (2013.01)

(56) References Cited

U.S. PATENT DOCUMENTS

| | | | | |
|---|---|---|---|---|
| 2006/0257141 | A1* | 11/2006 | Yamamoto | H04N 9/045 396/430 |
| 2007/0019883 | A1* | 1/2007 | Wong | G06T 7/0069 382/276 |
| 2009/0316995 | A1* | 12/2009 | Szeliski | G06T 5/003 382/199 |
| 2012/0148109 | A1* | 6/2012 | Kawamura | G01C 3/06 382/106 |
| 2012/0154541 | A1 | 6/2012 | Scott | |
| 2012/0300114 | A1* | 11/2012 | Isogai | G01S 17/46 348/345 |
| 2012/0307133 | A1* | 12/2012 | Gao | G02B 27/0075 348/349 |
| 2014/0079288 | A1* | 3/2014 | Lee | G06T 5/00 382/106 |
| 2015/0098644 | A1* | 4/2015 | Atif | G06T 7/0051 382/154 |
| 2015/0109514 | A1* | 4/2015 | Komatsu | G02B 7/38 348/349 |
| 2015/0125070 | A1* | 5/2015 | Atif | G06T 7/0069 382/154 |

FOREIGN PATENT DOCUMENTS

| | | |
|---|---|---|
| JP | 2010-016743 A | 1/2010 |
| KR | 10-1025405 B1 | 3/2011 |

OTHER PUBLICATIONS

Kehtarnavaz, N., et al., "Development and real-time implementation of a rule-based auto-focus algorithm", Real Time Imaging, 2003, No. 9, pp. 197-203.

Zhou, C., et al., "Coded Aperture Pairs for Depth from Defocus", IEEE 12th International Conference on Computer Vision (ICCV), 2009, pp. 325-332.

* cited by examiner

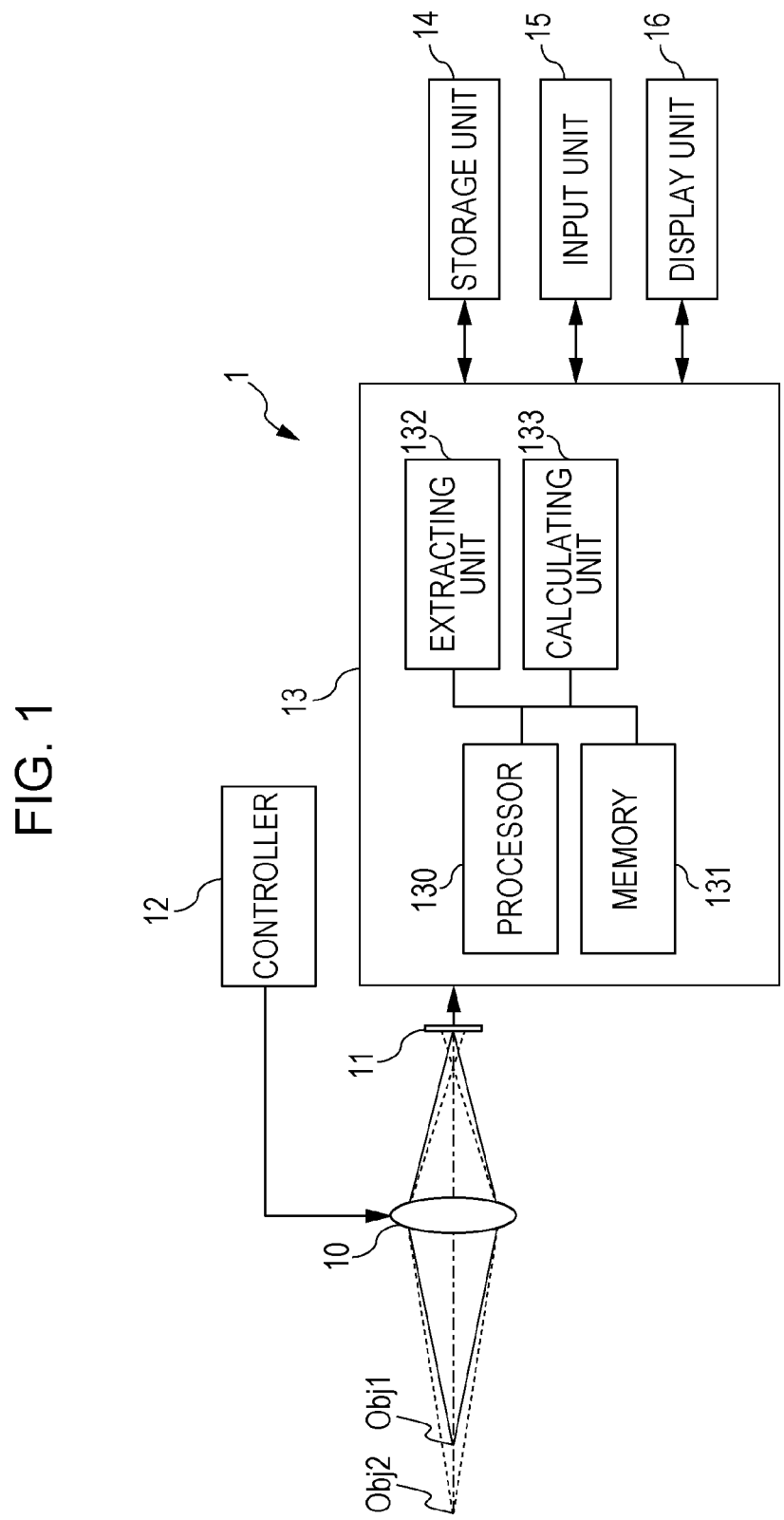

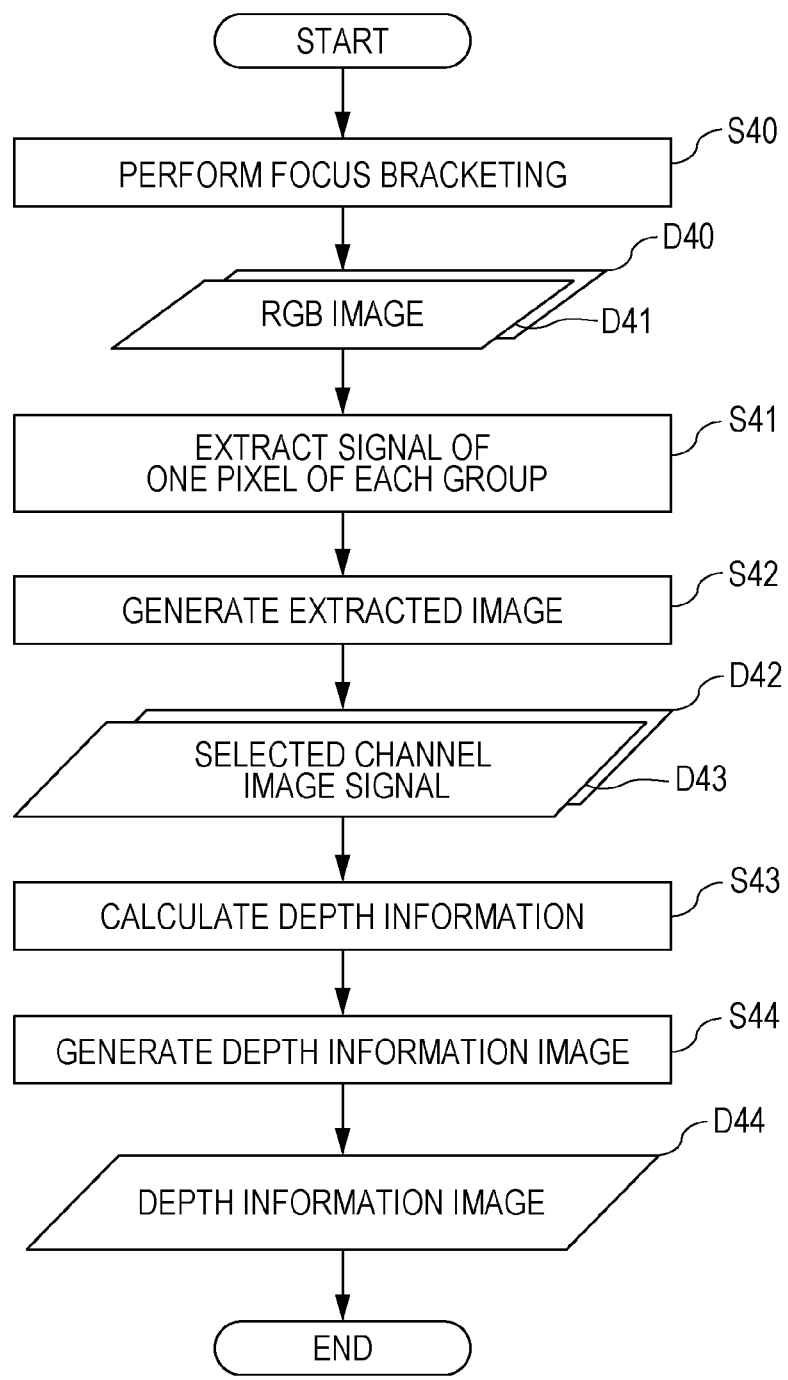

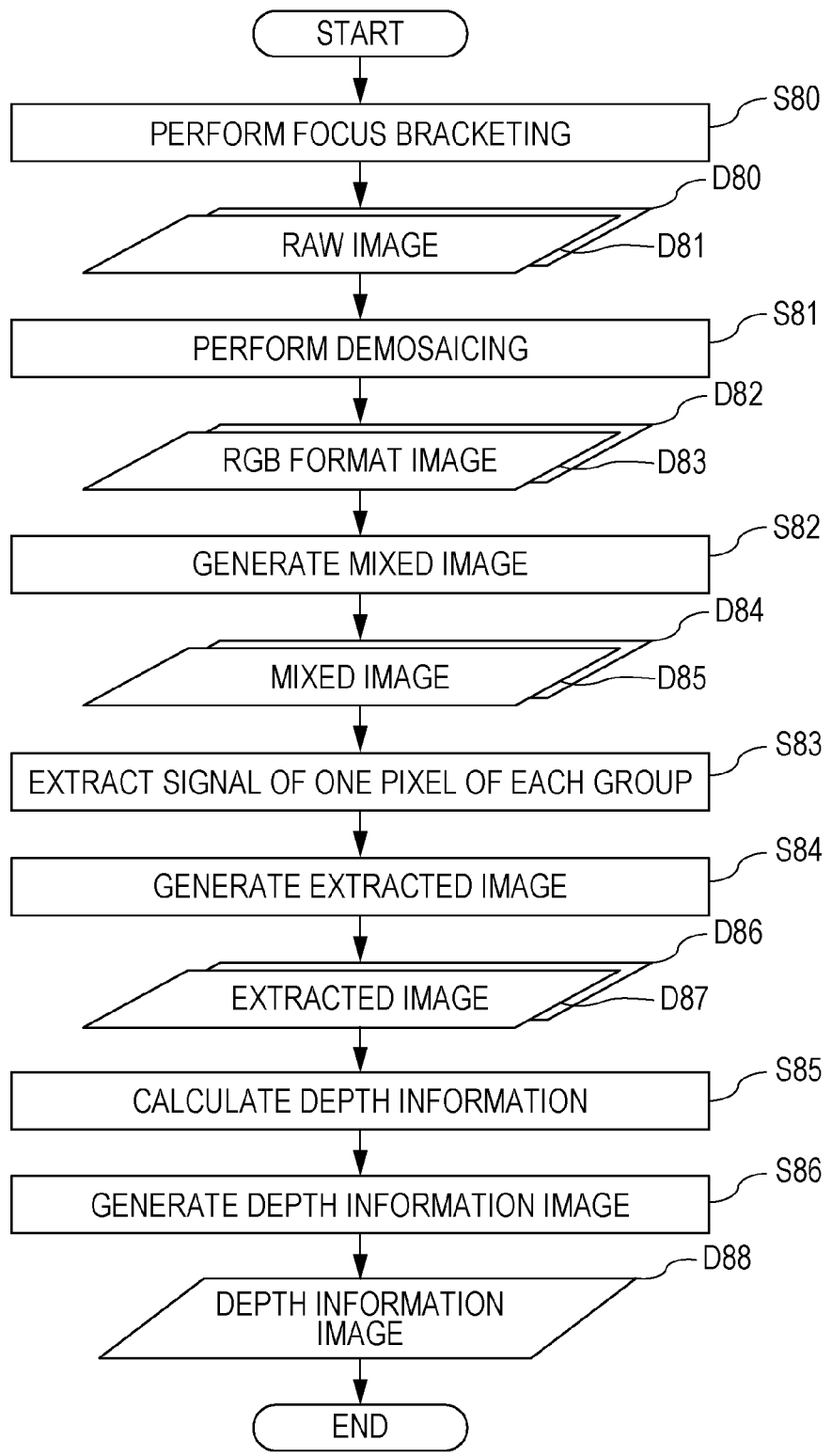

FIG. 6A

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

FIG. 6B

| R | R | R | R | R | R | R | R |
|---|---|---|---|---|---|---|---|
| R | R | R | R | R | R | R | R |
| R | R | R | R | R | R | R | R |
| R | R | R | R | R | R | R | R |
| R | R | R | R | R | R | R | R |
| R | R | R | R | R | R | R | R |
| R | R | R | R | R | R | R | R |
| R | R | R | R | R | R | R | R |

| G | G | G | G | G | G | G | G |
|---|---|---|---|---|---|---|---|
| G | G | G | G | G | G | G | G |
| G | G | G | G | G | G | G | G |
| G | G | G | G | G | G | G | G |
| G | G | G | G | G | G | G | G |
| G | G | G | G | G | G | G | G |
| G | G | G | G | G | G | G | G |
| G | G | G | G | G | G | G | G |

| B | B | B | B | B | B | B | B |
|---|---|---|---|---|---|---|---|
| B | B | B | B | B | B | B | B |
| B | B | B | B | B | B | B | B |
| B | B | B | B | B | B | B | B |
| B | B | B | B | B | B | B | B |
| B | B | B | B | B | B | B | B |
| B | B | B | B | B | B | B | B |
| B | B | B | B | B | B | B | B |

FIG. 6C

| M | M | M | M | M | M | M | M |
|---|---|---|---|---|---|---|---|
| M | M | M | M | M | M | M | M |
| M | M | M | M | M | M | M | M |
| M | M | M | M | M | M | M | M |
| M | M | M | M | M | M | M | M |
| M | M | M | M | M | M | M | M |
| M | M | M | M | M | M | M | M |
| M | M | M | M | M | M | M | M |

IMAGE PROCESSING DEVICE, IMAGE CAPTURING APPARATUS, AND IMAGE PROCESSING METHOD

BACKGROUND OF THE INVENTION

Field of the Invention

The present invention relates to an image processing device and an image capturing apparatus for obtaining a depth information image, which represents a distribution of depth information about an object, from a plurality of captured images. The present invention also relates to an image processing method for obtaining a depth information image, which represents a distribution of depth information about an object, from a plurality of captured images.

Description of the Related Art

Japanese Patent Laid-Open No. 01-167610 describes a "depth from defocus" (DFD) method for obtaining the distance to an object in the depth direction by using a two-dimensional image of the object captured by an image capturing apparatus. In the DFD method, a plurality of images that have different degrees of blurring are obtained by controlling the shooting conditions (also referred to as the shooting parameters) of an image capturing optical system. Then, the correlation between the sizes or the degrees of blur of a plurality of images is calculated by using a distance-measuring pixel and the surrounding pixels. The correlation between the sizes or the degrees of blur changes in accordance with the distance from the focus position of the image capturing optical system to an object. Therefore, the distance from the focus position of the image capturing optical system to the object can be obtained by using the correlation.

Japanese Patent Laid-Open No. 2010-016743 describes a distance-measuring apparatus for calculating the object distance by using a blur correlation, which is calculated for each of regions to be processed by using a DFD method. The distance-measuring apparatus sets a weight coefficient for the blur correlation for each of pixels in a region to be processed and calculates a weighted average of the blur correlation by using the weight coefficients.

In general, an image capturing optical system of an image capturing apparatus has an axial chromatic aberration, and therefore the focus positions differ between colors (wavelengths). As a result, in the case where depth information is calculated by using a correlation between the sizes or the degrees of blur, the calculated depth information has an error due to a color (wavelength). In other words, when depth information is calculated by using a DFD method or the like using a color image, a distance-measurement error due to a color (wavelength) occurs.

Japanese Patent Laid-Open No. 01-167610 and Japanese Patent Laid-Open No. 2010-016743 do not describe the occurrence of an error in depth information due to a color (wavelength).

The present invention provides a technology for obtaining depth information about an object with high precision by using a DFD method using a color image.

SUMMARY OF THE INVENTION

According to an aspect of the present invention, there is provided an image processing device for obtaining a depth information image representing a distribution of depth information about an object on the basis of a first image and a second image that have different degrees of blurring, the first and second images being captured by an image sensor including a plurality of groups each including a plurality of pixels that obtain different color information about the object. The image processing device includes an extracting unit that extracts signals, each corresponding to one of the plurality of pixels of each group, from the plurality of groups and generates a first extracted image and a second extracted image respectively corresponding to the first image and the second image, and a calculating unit that calculates the depth information image from a difference in degree of blurring between the first extracted image and the second extracted image. The signals each corresponding to one of the plurality of pixels of each group and extracted from the plurality of groups are signals corresponding to pixels that obtain the same color information.

According to another aspect of the present invention, there is provided an image processing method including an extraction step of extracting signals, each corresponding to one of a plurality of pixels of each of a plurality of groups of an image sensor, from the plurality of groups and generating a first extracted image and a second extracted image respectively corresponding to a first image and a second image that are captured by the image sensor and that have different degrees of blurring, the plurality of pixels obtaining different color information about an object; and a calculation step of calculating a depth information image representing a distribution of depth information about the object from a difference in degree of blurring between the first extracted image and the second extracted image, The signals each corresponding to one of the plurality of pixels of each group and extracted from the plurality of groups are signals corresponding to pixels that obtain the same color information.

Further features of the present invention will become apparent from the following description of exemplary embodiments with reference to the attached drawings.

BRIEF DESCRIPTION OF THE DRAWINGS

FIG. 1 is a schematic view illustrating an example of an image capturing apparatus including an image processing device according to a first embodiment.

FIG. 3 is a flowchart of an example of an image processing method according to the first embodiment.

FIG. 5 is a flowchart of an example of an image processing method according to the second embodiment.

FIGS. 6A to 6C illustrate generation of signals corresponding to extracted pixels according to the second embodiment.

DESCRIPTION OF THE EMBODIMENTS

Figures 2A, 2B:
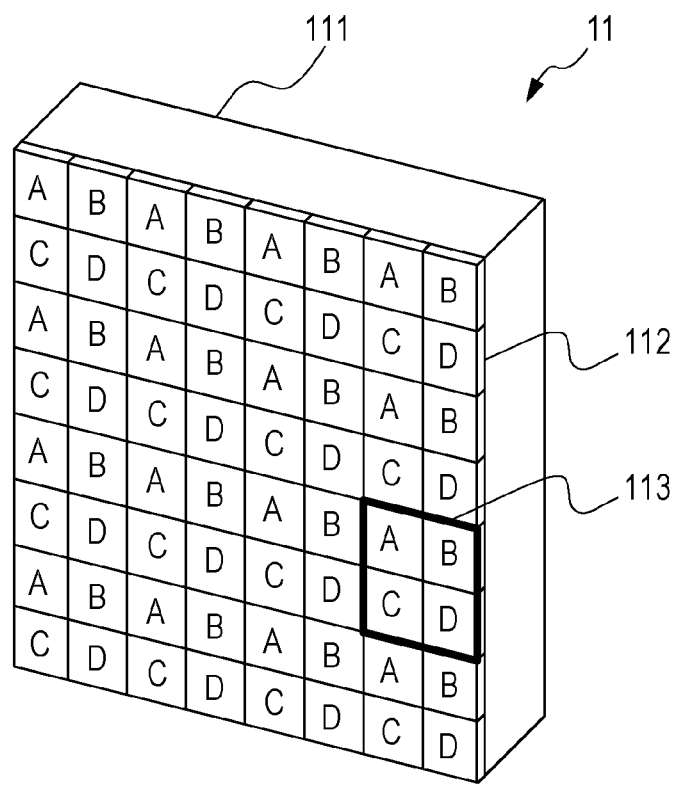
FIG. 2A is a partial schematic view of an image sensor according to the first embodiment.
FIG. 2B is a schematic view illustrating an example of an extracted image of a selected channel according to the first embodiment.

The present invention relates to an improvement of a technology (DFD method) for calculating depth information about an object in the depth direction on the basis of the difference in the degree of blurring between two or more images that are captured under different the shooting conditions. The present specification proposes a technology for calculating depth information about an object with high precision by using a DFD method even in a case where images captured by using an image capturing apparatus having a plurality of pixels for capturing different color information are used. This technology can be implemented as a function of an image processing device (image processing engine) mounted in an image capturing apparatus, such as a digital camera, a digital video camera, or a monitoring camera. The technology is used to perform various image processing operations on a captured image (such as operations of measuring a distance, generating a depth information image, clipping an object, blurring a background, and producing a blur effect).

In the present invention, the "depth information" may refer to any one of the relative distance from the midpoint between the focus positions of two images to an object, the relative distance from the focus position of one of two images to an object, and the absolute distance from the image capturing apparatus to an object at the time of capturing an image. The absolute distance or the relative distance may be a distance on the image-plane side or a distance on the object side. The distance may be represented as a distance in the real space or as a defocus amount.

Hereinafter, embodiments of the present invention will be described with reference to the drawings. The present invention is not limited to the embodiments.

First Embodiment

FIG. 1 is a schematic view illustrating an example of an image capturing apparatus 1 including an image processing device 13 according to a first embodiment. The image capturing apparatus 1 includes an image capturing optical system 10, an image sensor 11, a controller 12 of the image capturing optical system 10, the image processing device 13, a storage unit 14, an input unit 15, and a display unit 16.

FIG. 2A is a partial schematic view of the image sensor 11 according to the first embodiment. The image sensor 11 includes an image sensor 111 and a color filter 112. The color filter 112 is disposed on a side of the image sensor 111 on which light is incident. The image sensor 11 has a plurality of groups 113, each including pixels A, B, C, and D. Each of the pixels A, B, C, and D obtains color information about an object. Therefore, the color filter 112 has segmented regions, each of which allows a corresponding one of red, green, and blue light to pass therethrough. The segmented regions respectively correspond to the pixels A, B, C, and D.

The pixel A is provided with a red color filter that allows, mainly, visible light in a long wavelength range (wavelength range of 580 nm to 720 nm) to pass therethrough. The pixel B and the pixel C are provided with green color filters that allow, mainly, visible light in an intermediate wavelength range (wavelength range of 440 nm to 620 nm) to pass therethrough. The pixel D is provided with a blue color filter that allows, mainly, visible light in a short wavelength range (wavelength range of 400 nm to 540 nm) to pass therethrough. The image capturing apparatus 1 according to the present embodiment can obtain a color image through these pixels. In the present embodiment, the term "color information" refers to a color that is red, green, or blue, and luminance information about the color.

The image processing device 13 includes a processor 130, a memory 131, an extracting unit 132, and a calculating unit 133. The processor 130 performs the following signal processing operations on an analog signal output from the image sensor 11: AD conversion, noise reduction, demosaicing, conversion of a luminance signal and a color-difference signal, aberration correction, white balance correction, color correction, gamma correction, and the like. Digital image signals output from the processor 130 are stored in the memory 131, recorded (stored) in the storage unit 14, and used to, for example, calculate depth information.

The extracting unit 132 extracts signals, each corresponding to one of the pixels A, B, C, and D (for example, pixel B) of each group, from the groups of the image sensor 11. The signals are extracted from pixels of the groups that obtain the same color information. For example, in FIG. 2A, a signal corresponding to the pixel B of the group 113 is extracted. Then, the extracting unit 132 collects signals corresponding to the pixels B of all groups and generates, for example, an extracted image shown in FIG. 2B. As described below, the image sensor 11 obtains a first image and a second image that have different degrees of blurring. The extracting unit 132 generates two extracted images respectively corresponding to the first image and the second image. In other words, the extracting unit 132 generates a first extracted image from the first image and a second extracted image from the second image.

The calculating unit 133 calculates depth information about an object by using a DFD method on the basis of the difference in the degree of blurring between the first extracted image and the second extracted image, which have been generated by the extracting unit 132. The depth information is calculated so as to correspond to each group. Then, the calculating unit 133 collects the depth information corresponding to the groups and obtains a depth information image representing a distribution of the depth information about the object.

The storage unit 14 is a non-volatile storage medium for storing captured image data and parameter data used by the image capturing apparatus 1. The storage unit 14 may be any device that can read/write data at a high speed and that can store a large amount of data. For example, the storage unit 14 may be a flash memory.

The input unit 15 is an interface with which a user can specify a region for calculating a reference color (reference hue angle) and can set a mask. For example, the input unit 15 may include a dial, a button, a switch, or a touch panel. The display unit 16 may be a liquid crystal display, an organic EL display, or the like. The display unit 16 is used, for example, to check the composition of an image to be captured, to view images that have been captured and recorded, to display setting screens and messages, to display a specified region for calculating a reference color (reference hue angle), and to display a mask.

Principle of Calculation of Depth Information

Referring to FIG. 1, the principle of distance calculation using focus bracketing will be described. First, the controller 12 sets the focus of the image capturing optical system 10 at a first focus position Obj1, and an image of an object is captured through an optical path represented by a solid line.

Next, the controller 12 changes the focus of the image capturing optical system 10 to the second focus position Obj2, and an image of the same object is captured through an optical path represented by a broken line. Thus, the image sensor 11 obtains two images that have different degrees of blurring. The term "focus bracketing" refers to an image-capturing method in which the focus position, which is one of shooting conditions, is changed. Another example of a method for capturing two images that have different degrees of blurring by changing a shooting condition is aperture bracketing, in which two images are captured while changing the aperture diameter. In addition to these methods, the present invention can be applied to any appropriate method for capturing a plurality of images that have different degrees of blurring.

In the method of calculating depth information according to the present invention, the depth information is estimated by using the correlation between small regions of two images. According to the present invention, two extracted images generated by the extracting unit 132 as described above are used to calculate depth information. The two extracted images have different degrees of blurring. In the case where camera shake or movement of an object does not occur while an image is being captured, small regions at the same position are used. In the case where camera shake or movement of an object occurs while an image is being captured, small regions in which images of the same object are captured and which are obtained by performing a positioning operation are used. Hereinafter, it is assumed that camera shake or movement of an object does not occur. However, even in a case where camera shake or movement of an object occurs, the same method can be used by using small regions in which images of the same object are captured.

When an object is located at the focus position of the image capturing optical system 10, an image having the largest amount of information about the object can be obtained, and the image has a high contrast over the entire range from a high spatial frequency domain to a low spatial frequency domain. In contrast, when an object is not located at the focus position of the image capturing optical system 10, an image of the object is blurred, and the contrast of the image is decreased considerably in a high spatial frequency domain, although the contrast is not decreased considerably in a low spatial frequency domain. When an object is located at a position further away from the focus position of the image capturing optical system 10, the contrast of the image is decreased considerably also in the low spatial frequency domain.

In the present embodiment, the change in contrast in each of high and low spatial frequency domains on an actual image is obtained by using an image generated by band-pass filtering an extracted image, and depth information about an object is obtained by using the change in contrast.

To be specific, the calculating unit 133 calculates the correlation between small regions of two band-pass filtered extracted images, the small regions being at the same position, and calculates depth information about an object from the correlation. The correlation NCC between small regions of two band-pass filtered images is calculated by using expression (1).

$$NCC = \frac{\Sigma(I1_i - I1_{av})(I2_i - I2_{av})}{\sqrt{\Sigma(I1_i - I1_{av})^2}\sqrt{\Sigma(I2_i - I2_{av})^2}} \quad (1)$$

Here, $I1_i$ is a signal value of a pixel in a small region of a first band-pass filter extracted image, which is one of the two band-pass filtered images, and $I1_{av}$ is the average of the signal values in the small region of the first band-pass filter extracted image. $I2_i$ is a signal value of a pixel in a small region of a second band-pass filter extracted image, which is the other of the two band-pass filtered images, and $I2_{av}$ is the average of the signal values in the small region of the second band-pass filter extracted image.

Regarding a DFD method using a focus bracketing method, the correlation has the highest value at the midpoint between the focus positions of two extracted images, and the correlation decreases with increasing distance from the midpoint. By using this, it is possible to obtain the relative position of an object from the midpoint between two extracted images. Moreover, it is possible to determine whether or not the object is located on the front side of the midpoint between the focus positions of two extracted images (in a direction toward the image capturing apparatus 1) or on the back side of the midpoint (in a direction away from the image capturing apparatus 1). To be specific, if expression (2) is satisfied, the object is in a direction toward the focus position of the first extracted image from the midpoint between the focus positions of two extracted images. If expression (3) is satisfied, the object is in a direction toward the focus position of the second extracted image from the midpoint between the focus positions of two extracted images. On the basis of these facts, it is possible to calculate depth information about the object.

$$\Sigma(I1_i - I1_{av})^2 > \Sigma(I2_i - I2_{av})^2 \quad (2)$$

$$\Sigma(I1_i - I1_{av})^2 < \Sigma(I2_i - I2_{av})^2 \quad (3)$$

In a case where it is necessary to convert the depth information into an actual distance, the relationship between the defocus amount and the correlation in a spatial frequency range that the band-pass filter allows to pass therethrough may be calculated and stored beforehand. By doing so, the defocus amount can be inversely calculated from the correlation between two band-pass filtered images.

Here, the depth information is the relative distance from the midpoint between the focus positions of two extracted images to an object. Moreover, the distance from the image capturing apparatus 1 to an object can be calculated as follows. First, by using expression (4), the distance $S_{obj}$ from the image capturing apparatus 1 to the focus position f of the image capturing optical system 10 in each of two images is calculated from shooting parameters, such as the focal length of the image capturing optical system 10 and the amount of movement of the focusing lens.

$$\frac{1}{S_{obj}} = \frac{1}{S_{img}} - \frac{1}{f} \quad (4)$$

Here, $S_{img}$ is the distance from the rear principal point to the image plane of the image capturing optical system 10, and f is the focal length of the image capturing optical system 10.

It is possible to calculate the distance $S_{obj1}$ from the image capturing apparatus 1 to the focus position Obj1 when the first image is captured and the distance $S_{obj2}$ from the image capturing apparatus 1 to the focus position Obj2 when the second image is captured. Then, by using expression (5), the distance $S_{imgm}$ from the image capturing apparatus 1 to the midpoint between the focus positions of the two images can be calculated.

$$S_{objm} = \frac{S_{obj1} + S_{obj2}}{2} \quad (5)$$

In a case where an aperture bracketing method is used to capture two images that have different degrees of blurring, depth information about an object obtained from the two images is the relative distance from the focus position of the image capturing optical system 10. The distance from the image capturing apparatus to the object can be obtained in the same way as described above.

According to the present invention, at least depth information is calculated, and the actual distance may be calculated as necessary. Whether or not it is necessary to calculate the actual distance depends on the application. For example, applications such as clipping an object, blurring a background, and producing a blur effect can be realized by using only the depth information.

Image Processing Method

FIG. 3 is a flowchart of an image processing method according to the present embodiment. Referring to FIG. 3, a process through which the image capturing apparatus 1 according to the present embodiment calculates depth information and generates a depth information image will be described.

First, in step S40, the image capturing apparatus 1 performs focus bracketing. To be specific, a focus image is captured by focusing on a main object, and then a defocus image is captured by moving the focus position. Thus, the image sensor 11 captures two RGB images (D40, D41) that have different degrees of blurring. The term "image" refers to data that can be displayed on the display unit 16 and that has color information.

In step S41, the extracting unit 132 extracts signals, each corresponding to one pixel of each group and used to calculate depth information, from each group. In step S42, the extracting unit 132 generates an extracted image formed by only the signals of the extracted pixels. Here, two extracted images (D42, D43) are respectively generated from the two images that have different degrees of blurring. FIG. 2B illustrates an extracted image formed by collecting signals of only the pixels B of the groups shown in FIG. 2A. In other words, in the present embodiment, an extracted image is generated by collecting signals of green pixels, which correspond to the pixels B, from the RGB image of FIG. 2A obtained by the image sensor 11. Therefore, the extracted image has a size that is one fourth of that of the RGB image. Because the sensitivity of the light receiving section of the image sensor 11 is the highest in the frequency range of green, the extracting unit 132 may extract signals corresponding to green pixels as described above. The pixels B and C are both green pixels, and either of the signals of the pixels B and C may be extracted from each group. By using signals corresponding to pixels that are located at the same position, the precision in distance measurement can be increased.

In step S43, depth information about an object whose image is captured by each group is calculated from the two extracted images by using a DFD method. The depth information is calculated for to each group. In step S43, a depth information image (D44) is generated by collecting the depth information for all groups. The generated depth information image (D44) and the captured images (D40, D41) are stored in the storage unit 14.

The depth information image (D44) obtained here can be used to perform operations of, for example, producing a blur effect to the focus image in accordance with depth information, performing 3D conversion on the focus image, and clipping the object from the focus image.

Thus, in the present embodiment, depth information is calculated by using monochrome images generated by extracting signals corresponding to the same pixels of the groups from an RGB image.

In a DFD method, depth information about an object is calculated by using the difference in the degree of blurring between two images. Therefore, if the difference in the degree of blurring occurs due to factors other than the distance from the image capturing apparatus 1 to an object, the depth information has a measurement error. Examples of such factors other than the distance include the axial chromatic aberration of the image capturing optical system. In general, an image capturing optical system has axial chromatic aberration that was not removed. If the amount of such axial chromatic aberration is small, the effect of the aberration on a captured image is negligible. However, when calculating depth information by using a DFD method, only a small amount of axial chromatic aberration may cause a large measurement error in depth information. In particular, regarding a compact digital camera or a digital video camera, which has an image capturing optical system having a short focal length, the degree of blurring generated due to the image capturing optical system changes only slightly when the distance from the camera to an object changes. Therefore, axial chromatic aberration has a relatively large effect, and therefore a large measurement error in depth information occurs.

In order to reduce axial chromatic aberration to such a level that the aberration does not affect the calculation of depth information using a DFD method, it is necessary to increase the number of lenses of the image capturing optical system or to use a special optical material having a non-linear dispersion property, such as fluorite. However, taking such measures would increase the cost of the image capturing apparatus 1.

In contrast, the image capturing apparatus 1 according to the present embodiment generates a monochrome image from a color image, and calculates depth information about an object by using the monochrome image. Therefore, even in a case where the image capturing optical system has axial chromatic aberration, it is possible to calculate the depth information with high precision without being affected by the axial chromatic aberration. Thus, it is possible to use an existing image capturing optical system in an image capturing apparatus that calculates depth information by using a DFD method. Accordingly, it is possible to calculate depth information and generate a depth information image with high precision at a low cost.

In the present embodiment, the green signal, which has a largest effect on a luminance signal among color signals in the RGB format, is extracted. Therefore, it is not likely that dark noise of the image sensor affects an extracted image, and depth information can be calculated stably with high precision.

In the present embodiment, depth information about an object is calculated by using a DFD method. This is not a limitation. For example, depth information may be calculated by using a "depth from focus" (DFF) method. As with the DFD method, a DFF method is a method for calculating depth information about an object by using the difference in the degree of blurring. To be specific, from multiple images of an object captured by changing the focus positions of the image capturing optical system multiple times, images each of which is the most sharply focused in a corresponding one of pixels are selected, and depth information about the object is calculated on the basis of the focus positions of the selected images. A problem with the DFF is that, as with the DFD method, if the difference in the degree of blurring occurs due to factors other than the distance, a measurement error in depth information occurs. Accordingly, by using the effects of present invention, depth information can be calculated with high measurement precision.

Second Embodiment

The present embodiment differs from the first embodiment in that signals each corresponding to one of the pixels used to calculate the depth information are mixed signals each generated by mixing signals of different pixels of a corresponding one of the groups and in that an extracted image is generated from the mixed signals. Hereinafter, the difference from the first embodiment will be mainly described.

Figure 4:
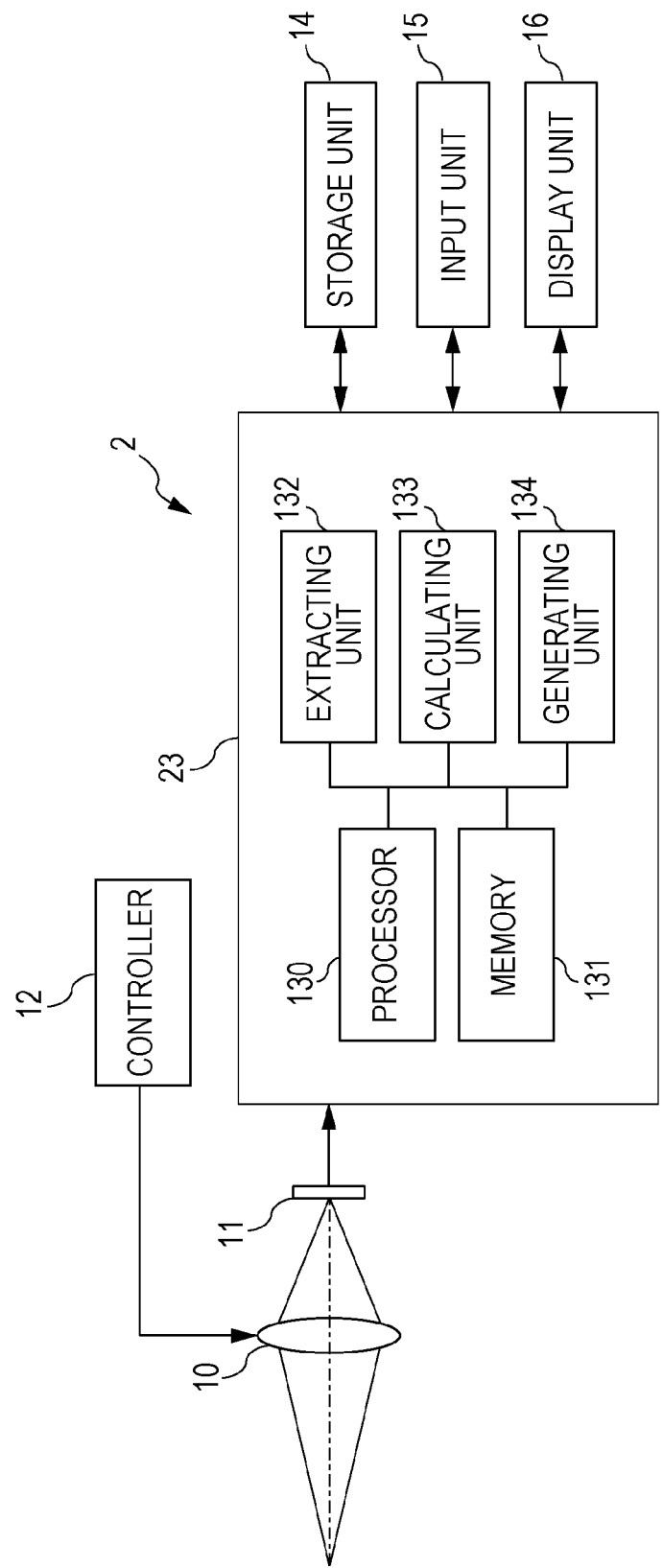
FIG. 4 is a schematic view illustrating an example of an image capturing apparatus including an image processing device according to a second embodiment.

FIG. 4 is a schematic view illustrating an example of an image capturing apparatus 2 including an image processing device 23 according to the present embodiment. According to the present embodiment, the image processing device 23 of the image capturing apparatus 1 includes a generating unit 134, in addition to the processor 130, the memory 131, the extracting unit 132, and the calculating unit 133.

The generating unit 134 generates mixed signals each corresponding to one of the pixels that is used to calculate at least depth information by mixing signals respectively corresponding to the plurality of pixels of each group. In the present embodiment, the mixing ratio of the mixed signal is 0.299 for red (R), 0.587 for green (G), and 0.114 for blue (B). This mixing ratio is adjusted to the luminous efficiency of the human eye. Therefore, use of this ratio brings an advantage in that a luminance signal Y* of the Y*U*V* format can be directly used as the mixed signal. The luminance signal Y* is stored in the memory 131, recorded in the storage unit 14, and used, for example, to calculate depth information.

FIG. 5 is a flowchart of an image processing method according to the present embodiment. FIG. 6A illustrates a raw image, FIG. 6B illustrates RGB format images, and FIG. 6C illustrates a mixed image. Referring to FIGS. 5 to 6C, a process through which the image capturing apparatus 2 according to the present embodiment calculates depth information and generates a depth information image will be described.

First, in step S80, as in the first embodiment, the image capturing apparatus 2 performs focus bracketing. Thus, the image sensor 11 captures two images (D80, D81) that have different degrees of blurring. The color filter 112, which is attached to the image sensor 111 of the image sensor 11, has transmission regions that respectively allow red (R), green (G), blue (B) light to pass therethrough. The transmission regions are arranged in a Bayer arrangement shown in FIG. 6A. The image sensor 11 captures raw images. The raw image shown in FIG. 6A is generated on the basis of signals generated by a part of the image sensor 11 illustrated in FIG. 2A. To be specific, the pixels A, B, C, and D shown in FIG. 2A respectively correspond to red pixels, first green pixels, second green pixels, and blue pixels. Color information for R, G, and B shown in FIG. 6A is obtained by using signals corresponding to the pixels A, the pixels B (or the pixels C), and the pixels D.

In step S81, the processor 130 performs an operation of demosaicing the raw images (D80, D81). The images (D82, D83) in RGB format shown in FIG. 6B, respectively corresponding to the raw images (D80, D81), are generated through the demosaicing operation. To be specific, a raw image is decomposed into red (R), green (G), blue (B) images, and, by interpolating missing pixels, an RGB format image having signal values for red (R), green (G), blue (B) of all pixels of the image is generated. Thus, two RGB format images (D82, D83), which have different degrees of blurring, are obtained through focus bracketing.

In step S82, the generating unit 134 generates a mixed image (Y*U*V* format image), which is shown in FIG. 6C, from each of the RGB format images (D82, D83). To be specific, a mixed signal corresponding to each pixel is generated by calculating a weighted average of signal values for red (R), green (G), blue (B) in the same group. At this time, the mixing ratio used to generate the mixed signal is 0.299 for red (R), 0.587 for green (G), and 0.114 for blue (B), which is the same as the mixing ratio of the luminance signal Y* of the Y*U*V* format. To be specific, a mixed signal M is calculated by using expression (6). Thus, two mixed image (D84, D85), which have different degrees of blurring, are generated.

$$M = 0.299 \times R + 0.587 \times G + 0.114 \times B \qquad (6)$$

Here, R, G, and B are respectively signal values of the red pixel, one of the green pixels, and the blue pixel in each group.

In step S83, the extracting unit 132 extracts a mixed signal that is used to calculate depth information from one of the pixels A, B, C, and D of each group. Here, mixed signals corresponding to pixels surrounded by thick lines in FIG. 6C are extracted from the signals of the mixed image. In other words, the mixed signals are signals corresponding to first green pixels (pixels B of FIG. 2A) of the raw image of FIG. 6A. In step S84, the extracting unit 132 generates extracted images (D86, D87), respectively corresponding to the mixed images (D84, D85), by collecting only the signals corresponding to first green pixels of the two mixed images (D84, D85).

The subsequent steps are the same as those of the first embodiment. To be specific, in step S85, the calculating unit 133 calculates depth information about an object whose image is captured by each group from the two extracted images (D86, D87), which have different degrees of blurring, by using a DFD method. In step S86, the calculating unit 133 generates a depth information image (D88) by collecting depth information for all groups. The generated depth information image (D88), the luminance signal Y* (mixed signal M), and the raw images (D80, D81) are stored in the storage unit 14.

As described above, in step S82, mixed signals corresponding to all pixels are generated. Alternatively, mixed signals corresponding to at least the pixels that are used to calculate the depth information (in the present embodiment, the pixels B) may be generated.

The depth information image (D88) obtained in step S86 can be used to perform operations of, for example, producing a blur effect in a focus image in accordance with depth information, performing 3D conversion of the focus image, and clipping an object from the focus image.

As described above, in the present embodiment, an extracted image is formed by collecting mixed signals corresponding to the pixels for the same color from mixed signals generated by mixing signals for different colors, and depth information about an object for each of the groups is calculated by using the mixed image.

By mixing signals of different pixels, it is possible to increase the sensitivity for an object having a spectrum for which it is difficult to obtain a high sensitivity by using a single pixel, and therefore the precision in calculating the distance can be improved. By using mixed signals corresponding to pixels for obtaining the same color information from the mixed signals of all the pixels, the effect of the axial chromatic aberration of the image capturing optical system can be reduced.

In the present embodiment, the mixing ratio of the mixed signal is 0.299 for red (R), 0.587 for green (G), and 0.114 for blue (B). However, this is not a limitation. The mixing ratio for the pixels of the image sensor having high sensitivity may be increased further. For example, the mixing ratio of the mixed signal may be 0.15 for red (R), 0.80 for green (G), and 0.05 for blue (B).

Third Embodiment

The present embodiment differs from the second embodiment in that axial chromatic aberration and field curvature of extracted pixels are corrected. Hereinafter, the difference from the second embodiment will be mainly described.

Figure 7:
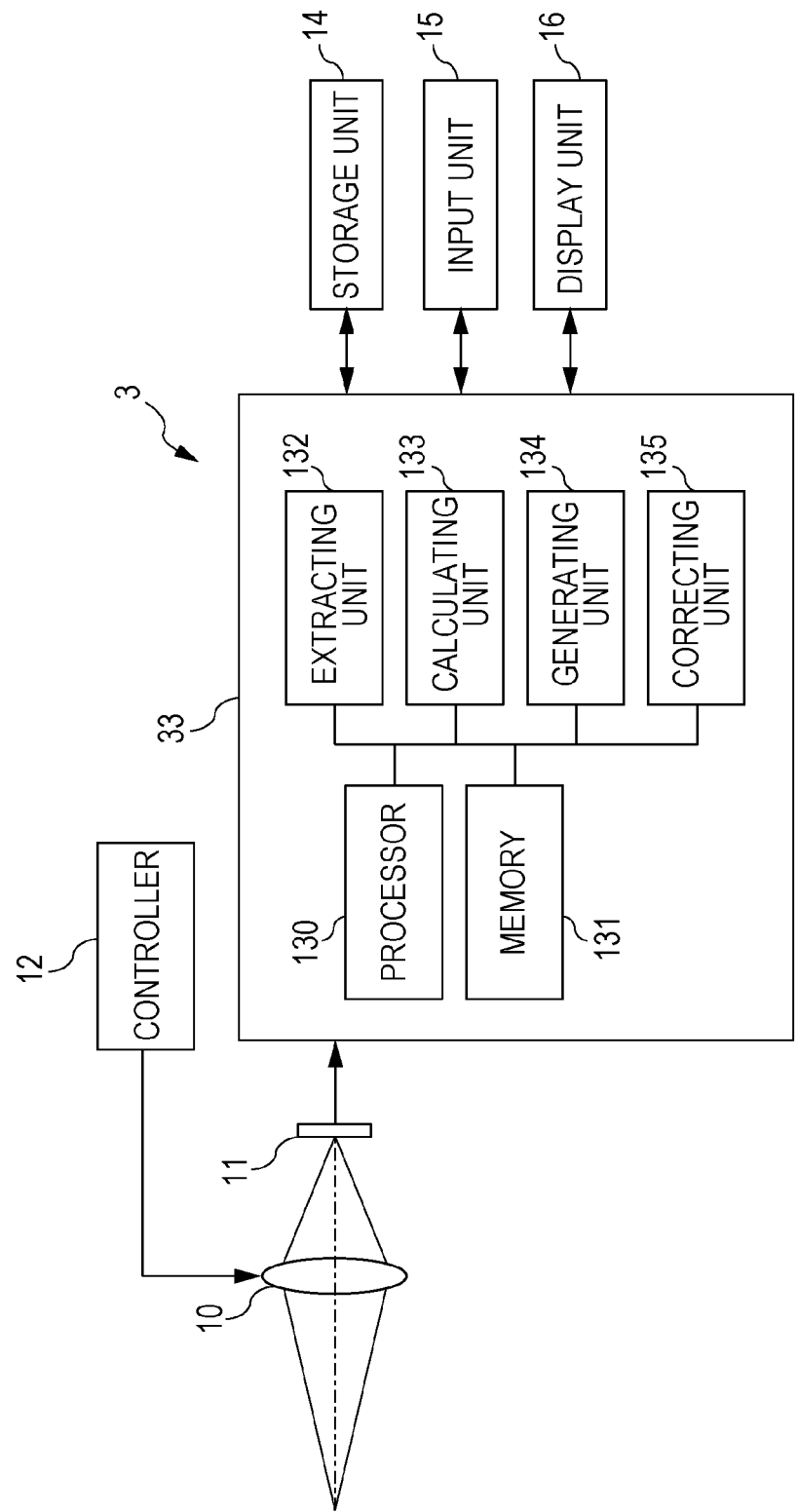
FIG. 7 is a schematic view illustrating an example of an image capturing apparatus including an image processing device according to a third embodiment.

FIG. 7 is a schematic view illustrating an image capturing apparatus 3 including an image processing device 33 according to the present embodiment. The image processing device 33 of the image capturing apparatus 3 according to the present embodiment includes a correcting unit 135, in addition to the processor 130, the memory 131, the extracting unit 132, the calculating unit 133, and the generating unit 134.

Figure 8A:
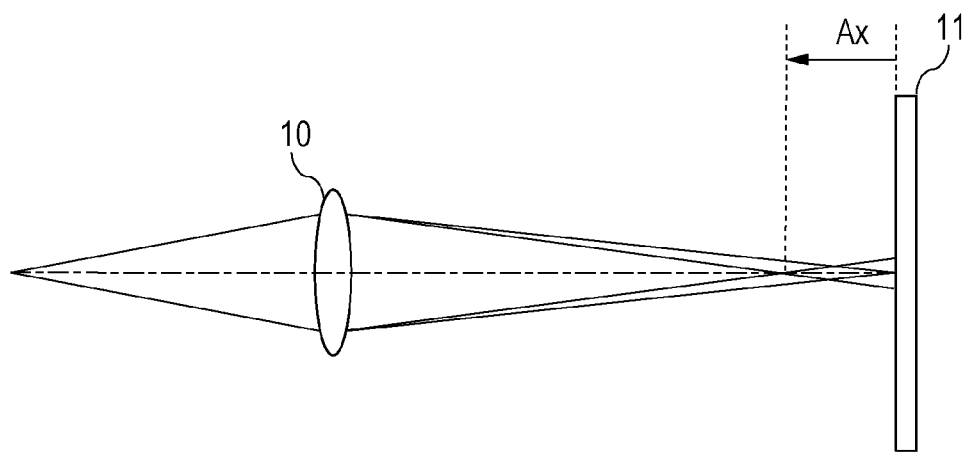
FIGS. 8A and 8B illustrate the axial chromatic aberration and the field curvature of a general image capturing optical system.
Figure 8B:
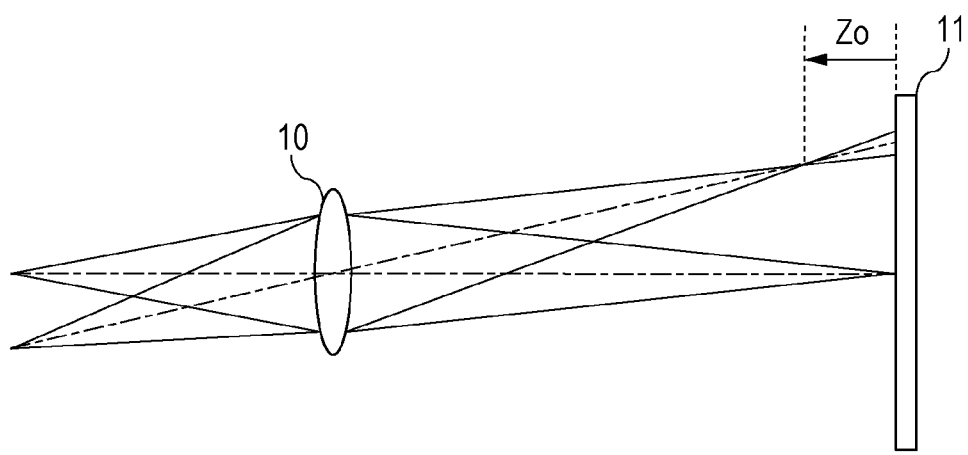

FIGS. 8A and 8B respectively illustrate the axial chromatic aberration and the field curvature of the image capturing optical system 10. The image capturing optical system 10 usually has axial chromatic aberration. The term "axial chromatic aberration" refers to a displacement of the focus position due to the difference in the wavelength of light. As in the image capturing apparatus 3, when the image sensor 11, which has a plurality of pixels for obtaining color information, is used, the focus position differs between pixels for different colors. In focus adjustment, the focus position is adjusted by using the average value of the pixels or the like. Therefore, the actual focal position for each pixel is displaced from the optimal position. In FIG. 8A, the amount of displacement, which is the defocus amount due to axial chromatic aberration, is denoted by Ax. Moreover, the image capturing optical system 10 usually has field curvature. The term "field curvature" refers to a displacement of the focus position due to the angle of view. The amount of field curvature is denoted by Zo in FIG. 8B. Furthermore, the amount of field curvature varies depending on the wavelength of light, and, as a result, chromatic aberration of field curvature occurs.

However, in a general image capturing optical system, axial chromatic aberration, field curvature, and chromatic aberration of field curvature cause only a small difference in the degree of blurring, which is almost insensible by the human eye, so that the quality of a captured image is not affected by these. However, in the case where depth information is calculated by using difference in the degree of blurring as in the present invention, the precision of detecting depth information is improved by detecting a small difference in the degree of blurring that is almost insensible by the human eye. Therefore, even if the amount of the aberration is small, a distance-measurement error occurs in depth information.

Accordingly, the image processing device 33 includes the correcting unit 135, which corrects a distance-measurement error in depth information for each group calculated by the calculating unit 133, the distance-measurement error being generated due to aberrations, such as axial chromatic aberration, field curvature, and chromatic aberration of field curvature.

Figure 9:
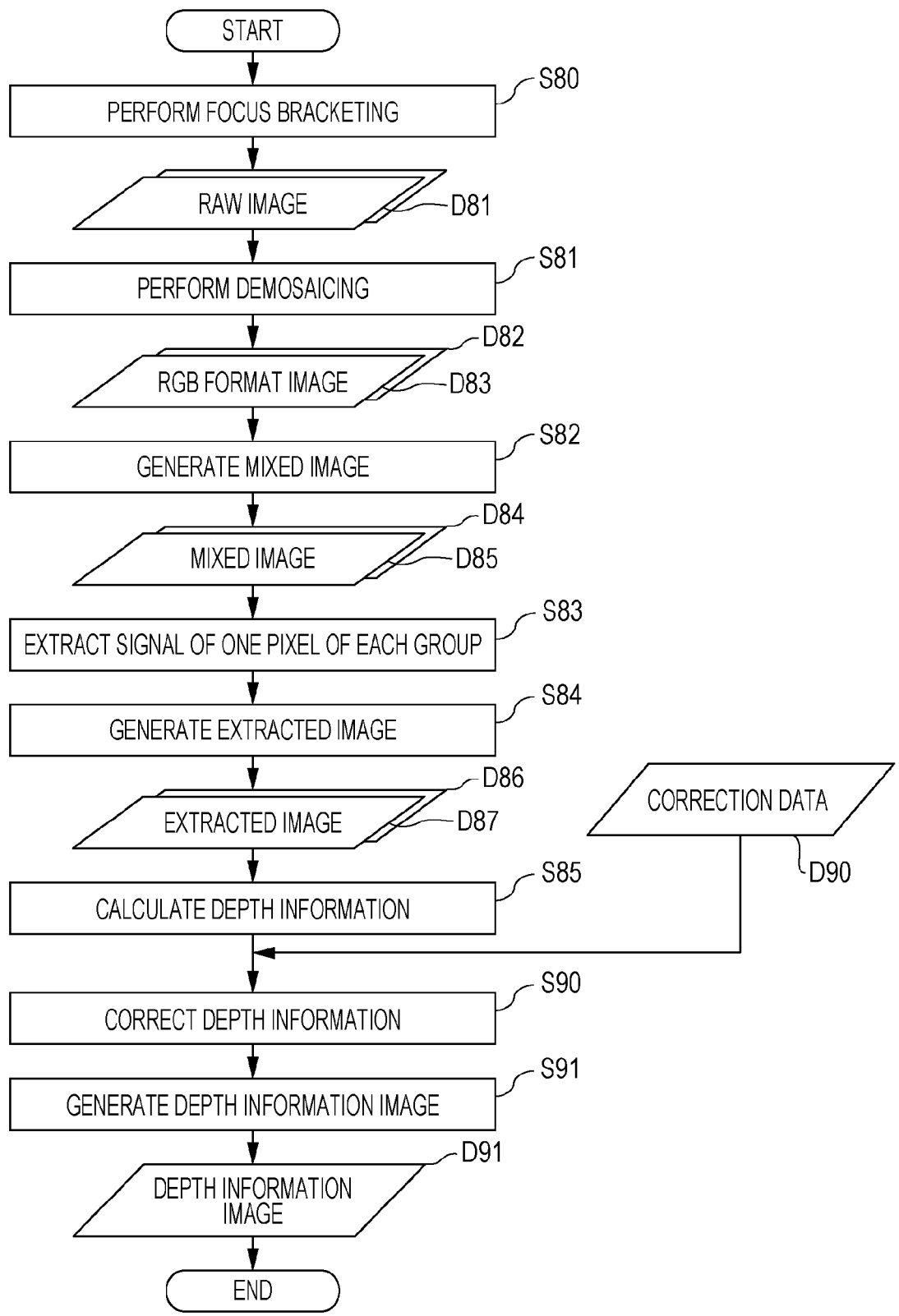
FIG. 9 is a flowchart of an example of an image processing method according to the third embodiment.

FIG. 9 is a flowchart of an image processing method according to the present embodiment. Referring to FIG. 9, a process through which the image capturing apparatus 3 according to the present embodiment corrects a distance-measurement error in depth information, which occurs due to the aberration of the image capturing optical system 10, and generates a corrected depth information image will be described.

Descriptions of steps S80 to S85, which are the same as those of the second embodiment, will be omitted.

In step S90, by using correction data (D90), the correcting unit 135 corrects an error generated due to the aforementioned aberrations in depth information for each group, which has been calculated by the calculating unit 133 in step S85. To be specific, in step S90, the depth information is converted into depth information having a higher precision by subtracting correction data (D90) for each group from the calculated depth information. In step S91, the calculating unit 133 collects the corrected depth information for all groups and generates a corrected depth information image (D91).

The correction data (D90) is stored in the storage unit 14 beforehand. The correction data (D90) can be obtained, for example, as described below.

Figure 10A:
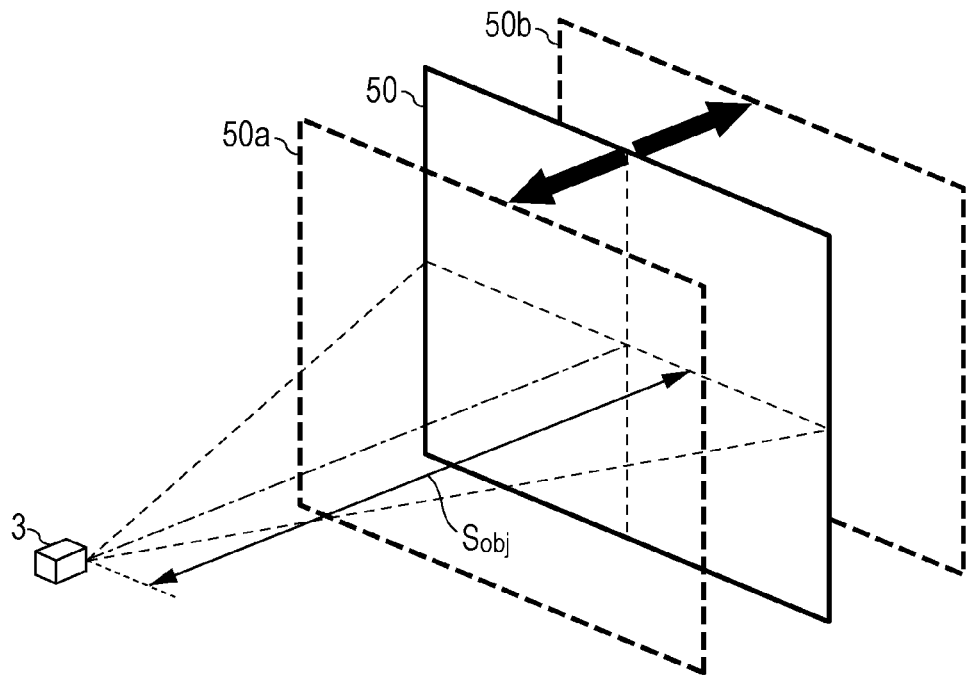
FIG. 10A is a schematic view of an apparatus for obtaining correction data of depth information according to the third embodiment.

Referring to FIG. 10A, an evaluation chart 50 is disposed at a position separated from the image capturing apparatus 3 by a certain distance. In the present embodiment, the evaluation chart 50 is a flat random-pattern image that is disposed at a position separated from the image capturing apparatus 3 by an object distance $S_{obj}$ of 3 m.

Figure 10B:
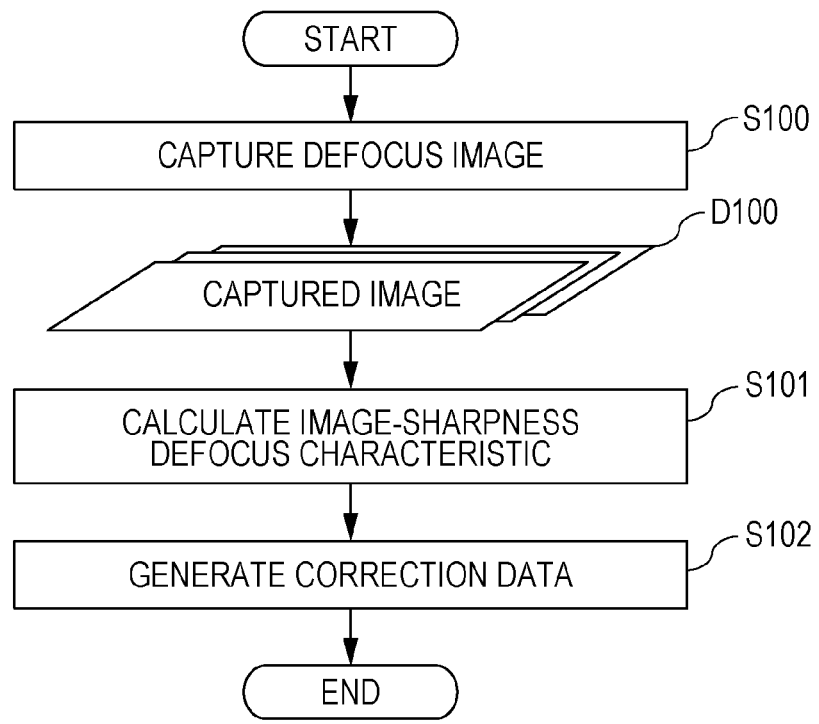
FIG. 10B is a flowchart of an example of a method of obtaining correction data of depth information.

Referring to FIG. 10B, in step S100, which is a step for capturing defocus images, images at defocus positions are captured while changing the position of the evaluation chart 50 between two positions (50a, 50b) in the depth direction. To be specific, first, the image capturing apparatus 3 focuses on the evaluation chart 50 and captures an image. Next, the evaluation chart 50 is moved in the depth direction, and the image capturing apparatus 3 captures another image. At this time, the focus position is located at the same position, which is at the object distance $S_{obj}$ of 3 m from the image capturing apparatus 3, and is not located at the position 50a or 50b, to which the evaluation chart 50 has been moved. By successively moving the position of the evaluation chart, images at defocus positions are captured. Thus, captured images (D100) of the evaluation chart 50 corresponding to the defocus positions are obtained.

In step 101, which is a step for calculating a image-sharpness defocus characteristic, the focus conditions of the images captured at the defocus positions are checked. To be specific, first, a captured image f captured at each of the defocus positions is filtered by using a Laplacian filter g represented by expression (7), thereby extracting high-frequency components (corresponding to 2.0 to 2.2 pixels) from the captured image f. Then, image sharpness I is calculated as the sum of absolute values of high-frequency components in a small region around the pixels. The image sharpness I is calculated by using expression (8).

$$g = \begin{bmatrix} 1 & 1 & 1 \\ 1 & -8 & 1 \\ 1 & 1 & 1 \end{bmatrix} \quad (7)$$

$$I(x, y) = \Sigma |f \otimes g| \quad (8)$$

By associating the image sharpness I with the defocus positions, an image-sharpness defocus characteristic corresponding to the image height can be calculated. The image sharpness I has the highest value at the focused position, and the image sharpness I decreases as the defocus amount increases. Therefore, it is possible to obtain a focus position corresponding to the image height (the amount of field curvature) and the depth of image sharpness (the amount of axial chromatic aberration). As described above, regarding depth information, the distance score has the highest value at the midpoint between the focus position of a focus image and the focus position of a defocus image, and the distance score of depth information has the lowest value in the vicinity of a region where the image sharpness of one of the images has the lowest value. Therefore, by obtaining the image sharpness, it is possible to obtain a defocus error of depth information corresponding to the image height and an error in depth of focus. In step 102, which is a step for generating correction data (D90), distance data for correcting depth information by an amount corresponding to the aforementioned error is generated.

The correction data (D90) is stored in the storage unit 14 of the image capturing apparatus 1 in a manufacturing process so that the correction data (D90) can be retrieved from the storage unit 14.

Thus, the image capturing apparatus 1 according to the present embodiment measures the image-sharpness defocus characteristic corresponding to the image height of the image capturing optical system, thereby obtaining a correspondence between the defocus position corresponding to the image height and the depth information. By using this correspondence, a conversion table, which enables conversion from depth information to the defocus position corresponding to the image height, is compiled. The conversion table is stored in the storage unit 14.

As heretofore described, according to the present embodiment, aberration of the image capturing optical system 10 (axial chromatic aberration, field curvature, and chromatic aberration of field curvature) are corrected, thereby it is possible to obtain depth information and a depth information image of an object with high distance-measuring precision.

Fourth Embodiment

The image processing method according to the present invention, which is described above, can be applied to, for example, an image capturing apparatus, such as a digital camera or a camcorder; and to an image processing device or a computer that performs image processing on image data obtained by an image capturing apparatus. The technology according to the present invention can be also applied to various electric apparatuses (cell phones, smartphones, slate terminals, personal computers, and the like), in which the image capturing apparatus or the image processing device can be mounted. In the embodiments described above, functional blocks of the image processing device are incorporated in the body of an image capturing apparatus. However, the functional blocks of the image processing device may be incorporated in any appropriate apparatus. For example, the image processing device may be incorporated in a computer having an image capturing apparatus, and the computer may calculate the distance on the basis of images captured by the image capturing apparatus. The image processing device may be incorporated in a computer connected to a wired or wireless network, and the computer may calculate the distance by obtaining a plurality of images through the network. The obtained depth information can be used to perform various image processing operations, such as region segmentation of an image, generation of a three-dimensional image or a depth image, and emulation of a blur effect.

The functions of the image processing device according to the present invention may be implemented in software (program) or hardware. For example, a program may be stored in a memory of a computer (such as a microcomputer or FPGA) incorporated in an image capturing apparatus, and the computer may execute the program to perform various processing operations according to the present invention. A dedicated processor, such as an ASIC, may be used to perform all or some of the processing operations according to the present invention.

In the embodiments described above, the image capturing apparatus captures an image by using visible light. However, this is not a limitation. The image capturing apparatus may be an apparatus that captures an image by using infrared radiation or ultraviolet radiation. In this case, signals of pixels of each group of the image sensor that have the highest sensitivity may be used to generated an extracted image. This is because the noise level is reduced and therefore distance measurement can be stably performed with high precision. It is particularly effective for capturing an image of a dark object.

With the present invention, it is possible to obtain depth information with high precision by using a DFD method using a color image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-207018, filed Oct. 2, 2013, which is hereby incorporated by reference herein in its entirety.

What is claimed is:

1. An image processing device for obtaining a depth information image representing a distribution of depth information about an object on the basis of a raw first image and a raw second image that have different degrees of blurring, the first and second images being captured by an image sensor having a plurality of groups of pixels each group including a red pixel that obtains red information, a green pixel that obtains green information, and a blue pixel that obtains blue information, the image processing device comprising:
   a mixing unit configured to mix signals of the red pixel, the green pixel, and the blue pixel and generate a first mixed image and a second mixed image respectively corresponding to the first raw image and the second raw image;
   an extracting unit configured to extract signals, each corresponding to one of the red pixel, the green pixel and the blue pixel of each group, from each of the first mixed image and the second mixed image and generate a first extracted image and a second extracted image respectively corresponding to the first mixed image and the second mixed image; and
   a calculating unit configured to calculate the depth information image from a difference in degree of blurring between the first extracted image and the second extracted image.

2. The image processing device according to claim 1, wherein the calculating unit is configured to calculate depth information for each group on the basis of the difference in degree of blurring between the first extracted image and the second extracted image, wherein the image processing device further includes a correcting unit configured to correct an error in the depth information for each group, the error being generated due to aberration, and wherein the calculating unit is configured to calculate the depth information image from the depth information for each group corrected by the correcting unit.

3. The image processing device according to claim 1, wherein the one of the plurality of pixels is located at the same position in each group.

4. The image processing device according to claim 1, wherein the one of the plurality of pixels is located at the same position in each group.

5. The image processing device according to claim 1, wherein the extracting unit extracts signals, each corresponding to the green pixel of each group, from the first mixed image and the second mixed image and generates the first extracted image and the second extracted image.

6. An image capturing apparatus comprising:
an image capturing optical system;
an image sensor including a plurality of groups each including a plurality of pixels that obtain color information about an object; and
the image processing device according to claim 1.

7. An image processing method of obtaining a depth information image representing a distribution of depth information about an object on the basis of a first raw image and a second raw image that have different degrees of blurring, the first and second images being captured by an image sensor having a plurality of groups of pixels each group including a red pixel that obtains red information, a green pixel that obtains green information, and a blue pixel that obtains blue information, the method comprising:
a mixing step of mixing signals of the red pixel, the green pixel, and the blue pixel to generate a first mixed image and a second mixed image respectively corresponding to the first raw image and the second raw image,
an extraction step of extracting signals, each corresponding to one of the red pixel, the green pixel and the blue pixel of each group from each of the first mixed image and the second mixed image and generating a first extracted image and a second extracted image respectively corresponding to the first mixed image and the second mixed image; and
a calculation step of calculating the depth information image from a difference in degree of blurring between the first extracted image and the second extracted image.

8. The image processing method according to claim 7, wherein the calculation step includes
a step of calculating depth information for each group on the basis of the difference in degree of blurring between the first extracted image and the second extracted image,
a correction step of correcting an error in the depth information for each group, the error being generated due to aberration, and
a step of calculating the depth information image from the depth information for each group corrected in the correction step.

9. The image processing method according to claim 7, wherein the one of the plurality of pixels is located at the same position in each group.

10. The image processing method according to claim 7, wherein the plurality of pixels include a pixel that obtains red information, a pixel that obtains green information, and a pixel that obtains blue information.

11. The image processing method according to claim 7, wherein the one of the plurality of pixels is located at the same position in each group.

12. A non-transitory computer readable storage medium storing a program which causes a computer to perform the steps of the image processing method according to claim 7.

* * * * *